March 1, 1955      G. KRETCHMAR      2,703,310
APPARATUS FOR MOLECULAR DISTILLATION
Original Filed Feb. 16, 1949      2 Sheets-Sheet 1
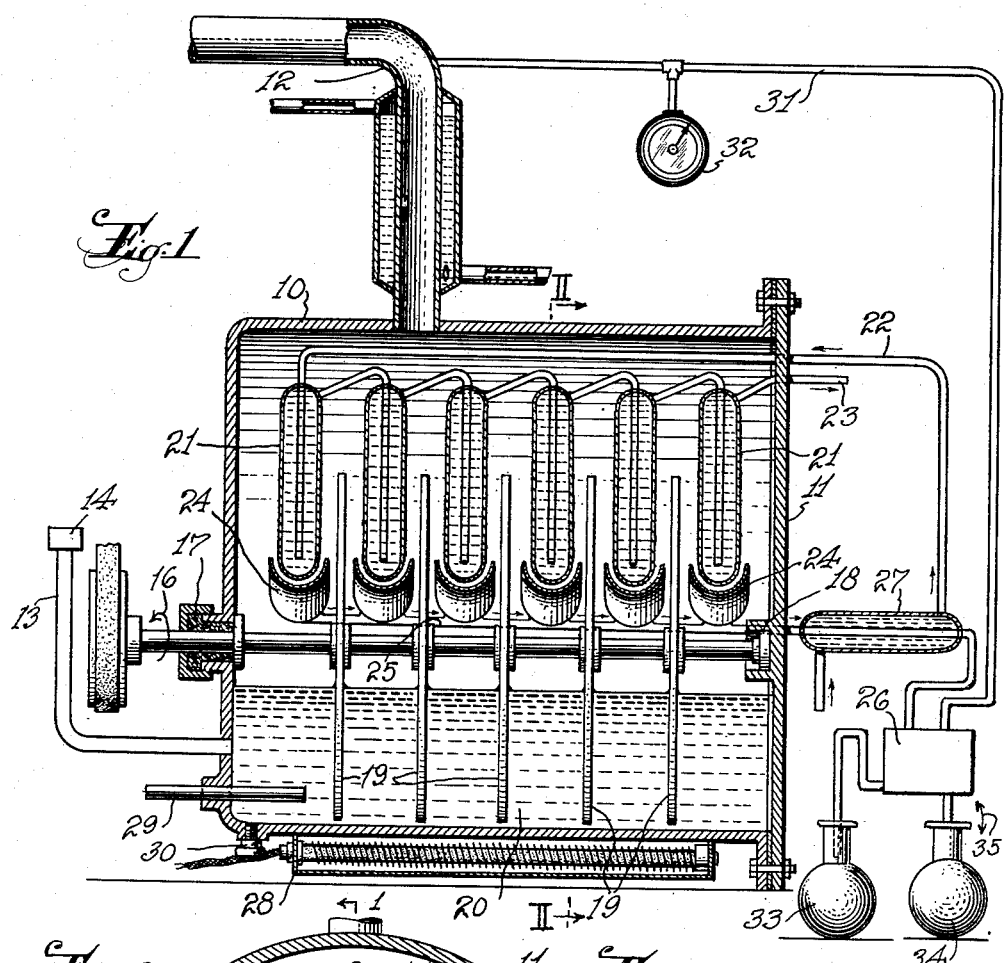
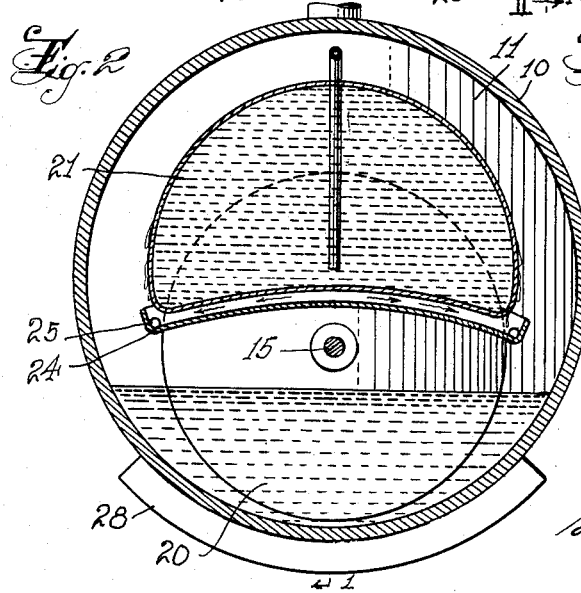
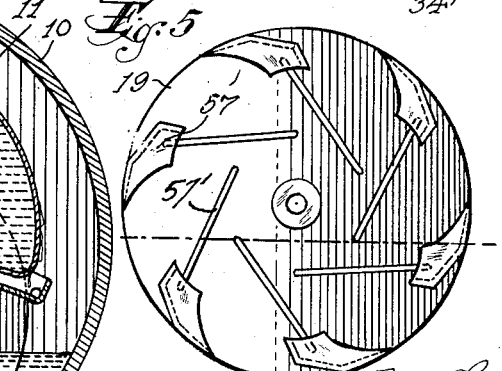
Inventor:
Gustave Kretchmar

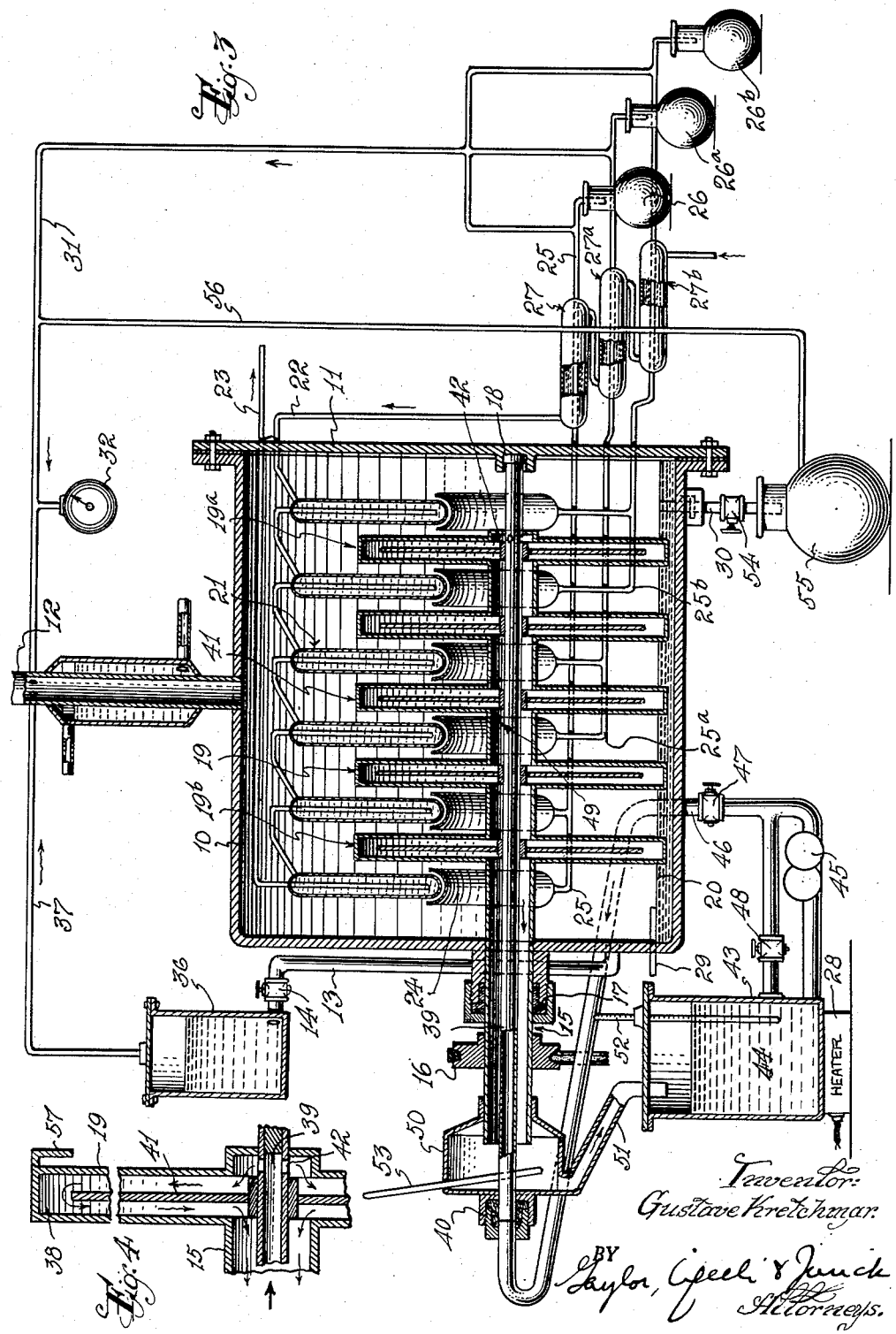

United States Patent Office 2,703,310
Patented Mar. 1, 1955

2,703,310

APPARATUS FOR MOLECULAR DISTILLATION

Gustave Kretchmar, Geneva, Switzerland, assignor to The Givaudan Corporation, New York, N. Y., a corporation of New Jersey Continuation of application Serial No. 76,825, February 16, 1949. This application December 3, 1953, Serial No. 395,986

6 Claims. (Cl. 202—205)

The present invention relates to an apparatus for molecular and fractional distillation, this is to say a distillation which takes place under a very low pressure, generally below 1/100 millimeter of mercury and at a temperature below that of the boiling points of the substances to be distilled, at the pressure contemplated, which allows to separate the constituents of a mixture.

In the industrial apparatus hitherto known the material to be distilled drops on to a heated surface, the so-called evaporating surface (or evaporator) and runs in a thin layer over said surface. The molecules which escape from the running liquid film are condensed by a cold surface (condenser) adjacent to the heated surface.

These apparatus are supplied in a regular and continuous manner with the material to be distilled. A partial or total evaporation of the material is effected; the condensate of the evaporated products as well as the non-distilled residues run off in a known manner, the first one on the cold surface and the latter one on the heated surface. These apparatus generally operate at a predetermined temperature, this is to say that the evaporating surface is heated to a fixed temperature; they do not therefore allow in general a fractionated distillation.

The apparatus forming the subject of the present invention comprises, as those already known, at least one carrier designed to carry the matter to be distilled at the time of its evaporation opposite a condenser surface.

In this apparatus the said carrier is movable and disposed in such a manner as to dip partly into the matter to be distilled in such a way that the said carrier by its movements carries with it some of the matter to be distilled and forms therewith a film of great delivery that passes opposite the condenser surface, heating means being provided in order that at least part of the matter forming the said film be hot.

Owing to its movable carrier, this apparatus generates continuously moving liquid films of the matter to be distilled. The molecules that escape from these films are condensed on the condenser surface. The condensed product runs off regularly, and can be collected by successive fractions as a function of the temperature, the pressure and the duration of the operation.

Thus the substance to be distilled and fractionated passes thousands of times, according to a scale of temperatures, opposite to the condensers. Due to the numerous passages, the lighter molecules escape at first, whereas the heavy ones go back to be mixed with the undistilled product. This new mechanism allows the separation of the constituents of a mixture by distillation.

This fractionation gives a result similar to the one obtained by a good fractionating column. In a column, the fractionation takes place by series of successive distillations, whereas in my apparatus the fractionation is the result of numerous occasions given to the molecules to escape from the liquid films of great delivery, constantly renewed and this at temperatures below the boiling temperatures.

The novel apparatus is suitable for laboratory and industrial operation. It allows the conducting of fractionated molecular distillation, either continuously or discontinuously.

The movable carrier or carriers can be disposed in a closed vessel designed to receive the matter to be distilled. This vessel can comprise at its lower portion, heating means which permit the matter to be distilled and fractionated to be brought to the temperature required for its molecular distillation. The latter is now carried out discontinuously, that is to say, the apparatus receives the matter to be distilled and fractionated, in a single charge; when the operation is terminated, one starts afresh with another batch.

According to another embodiment of my novel apparatus, the heating means can be disposed in a manner to heat the movable carrier or carriers. In this case, the apparatus can be designed so as to permit fractionated distillations and distillations in a continuous run, that is it can be particularly suited to perform fractionated distillations in a continuous run and non-fractionated distillations in a continuous or a discontinuous run. It offers therefore considerable advantages over the apparatus hitherto known which merely enable molecular distillation in a continuous run, without methodical fractionation.

The accompanying drawings represent, diagrammatically and by way of example, two embodiments of the apparatus according to the invention:

Fig. 1 is a vertical section across a first embodiment of the apparatus, which allows of performing fractional distillations in a discontinuous manner;

Fig. 2 is a section along the line II—II of Fig. 1;

Fig. 3 is a vertical section across a second embodiment of the apparatus, which allows fractionated distillations in a continuous manner;

Fig. 4 is a detail view of a movable carrier; and

Fig. 5 is a side view of one of the discs showing the cups.

In all figures of the drawings, the same reference numerals indicate similar or equivalent parts.

The apparatus represented in Figs. 1 and 2 comprises a hermetically closed vessel constituted by a cylindrical body 10, closed by a removable lid 11. This vessel is connected by a conduit 12 to one or more vacuum pumps. It is provided with a supply pipe 13 which can be hermetically closed at 14.

A horizontal shaft 15 capable of being driven in a rotary motion as indicated by the arrow 16, is journalled in the body 10, traversing the latter by a packing gland 17. The other end of this shaft 15 rests in a bearing 18 housed in the lid 11. The shaft 15 carries several disks 19 wedged on it. These disks may present on their periphery and on their two parallel faces small cups 57 and baffle plates 57' designed to draw liquid 20 which is found in the lower part of the body 10.

A battery of condensers 21 parallel to the two faces of the disks 19 is arranged in the closed vessel on both sides of the disks 19. These condensers are passed in series by a refrigerant brine as indicated by the conduits 22 and 23.

Under each condenser there is arranged a gutter 24, and each of these gutters communicates with two manifolds 25. These manifolds pass through the lid 11 and terminate in a separator device 26 after having passed through a cooler 27. Heating means 28, for example electrical ones, are disposed at the lower part and outside the closed vessel. The latter comprises moreover in its lower part a thermometer 29 and a drainage orifice 30, normally obturated by a plug.

The conduit 12 is connected with the separator device 26 by a pipe 31 from which a manometer 32 is branched off. The flasks 33 and 34 are connected to the separator 26 in such a manner that they can be alternately put into communication with this separator, owing to their being raised or lowered, as indicated by the arrow 35.

The operation of the apparatus described hereabove is as follows:

The material to be distilled and fractionated is supplied into the closed vessel by the pipe 13, the latter being then obturated at 14. As high as possible a vacuum is generated in the closed vessel by vacuum pumps connected with the conduit 12. The liquid 20 is heated by the aid of the heating means 28. The shaft 15 is set in rotation and the cups and baffle plates carried by the disks assure the continuous formation of liquid currents on both sides of the disks, as well as a slight stirring of the liquid 20. The faces of the disks 19 constitute the surfaces designed to carry the material to be distilled at the time of its evaporation, and the films of this material, thus formed, find themselves opposite the condensing surfaces of the condensers 21.

According to the nature of the liquid 20, a degassing of this liquid will take place at the beginning of the evacuation of the closed vessel. When this degassing is terminated, the molecular fractionation proper takes place under a very low pressure. The molecules of the material escaping from the liquid currents that covers these disks are condensed on the condensers 21. The condensate is first collected in the gutters 24, then by the manifolds 25 and arrives in the separator 26. When the distillation to be effected is not a fractionated distillation, the condensate will be collected in one and the same flask. The temperature of the liquid 20, measured by means of the thermometer 29, will remain practically constant.

The apparatus allows to carry out a fractionated distillation. By observing the variations in temperature of the liquid 20, the different fractions can be separated, allowing the condensate to run off at one time into the flask 33, and at another time into the flask 34, by lowering that one of the flasks in which the condensate is to be collected. The fractionation takes place by the numerous passages of the substance in face of the condensers. On each passage the lightest parts evaporate, whereas the heaviest parts go back to be mixed with the undistilled portion.

The manometer 32 and the thermometer 29 allow the control of the course of the fractionation. When the latter is terminated, the apparatus is emptied, cleaned and ready to receive a new charge of material to be distilled and fractionated. Its operation is accordingly discontinuous and allows the distillation of any chemical substance, synthetic or natural, as well as any mixture of such substances.

The apparatus described hereabove offers the following advantages:

(1) It is of simple and sturdy construction.

(2) It permits a fractionated molecular distillation, the number of fractions of which is unlimited, and this with the greatest ease; for it suffices to provide the desired number of flasks 33, 34.

(3) Its starting and supervision during its operation are extremely simple so that a single operator can assure the perfect running of a dozen of apparatus. It is easier to operate than the apparatus for fractionated distillation hitherto known.

(4) It does not comprise any cock or valve, which components are the frequent sources of leakage; for their perfect tightness is difficult to attain.

The apparatus represented in Figs. 3 and 4 comprises, like that described in connection with Figs. 1 and 2, a cylindrical body 10, a removable lid 11, a conduit 12 connected with one or more vacuum pumps, a charging pipe 13, a packing gland 17, a bearing 18, rotary disks 19 (which in the apparatus according to the second embodiment comprise heating means), condensers 21, conduit 22 for the entrance of codant fluid and a conduit 23 for the exit of such fluid, gutters 24, a thermometer 29, a drain pipe 30, a vent pipe 31 and a manometer 32.

The supply pipe 13 is under the control of a cock 14 and is connected to a reservoir 36 containing the matter to be distilled and fractionated. The interior of this reservoir 36 is under the same pressure as the interior of the closed vessel delimited by the cylindrical body 10 and the lid 11, owing to a pipe 37 which connects it to the conduit 12. The matter to be distilled runs by gravity from the reservoir 36 into the said closed vessel where it forms a liquid layer 20.

The disks 19 which bear on their faces cups and baffle plates 57, 57', respectively, are hollow in such a manner as to present each an internal cavity 38. They are mounted on a likewise hollow horizontal shaft 15 which is set in rotation by means of a driving pulley 16 driven by a motor. A pipe 39 is disposed in the interior of the hollow shaft 15 and is supported, on the one hand, in the bearing 18 and, on the other hand, in a packing gland 40. This pipe 39 is integral with the hollow shaft 15, it turns therefore with it, and for this purpose, the packing gland 40 constitutes also a bearing. In each cavity 38 of the hollow disks 19 there is a baffle 41 mounted on the tube 39 (see Fig. 4) and the latter presents outlet orifices 42 at its end adjacent the bearing 18.

A reservoir 43, comprising a heating device 28 (which may be for example an electrical heating body), contains a heating liquid 44. A pump 45 draws the liquid 44 from the reservoir 43 and passes it through the pipe 46 right up to the packing gland-bearing 40 where this liquid is injected into the rotary tube 39. Regulating valves 47 and 48 allow the control of the quantity of the heating liquid passed into the pipe 39. This liquid emerges from the tube 39 by the orifices 42 and passes through the cavities 38 of the disks 19 (as indicated by the arrows of Fig. 4) until it reaches the periphery of these cavities owing to the baffles 41. By its passage through the cavities 38 the liquid 44 heats the disks 19; it constitutes therefore together with the elements in which it is conducted, heated and moved, the heating means of the apparatus. After having passed the cavities 38 of the disks in the general sense of the arrow 49, the heating liquid emerges at the open end of the shaft 15 into the box 50 from where it is returned to the reservoir 43 by the pipe 51. A thermometer 52 allows the checking of the temperature of the heating liquid in the reservoir 43, and a thermometer 53 measures the temperature of this liquid at the exit from the hollow shaft 15. The temperature indicated by the thermometer 52 corresponds practically to the temperature at which the first disk 19a is heated, and that indicated by the thermometer 53 to the temperature at which the last disk 19b is heated.

The gutters 24 are connected in pairs to manifolds 25, 25a and 25b, respectively. The liquid collected in the manifold 25 is passed to a flask 26 after having passed through a cooler 27. The same happens to the liquids collected in the manifolds 25a and 25b which are respectively passed to the flasks 26a and 26b, after having been cooled in the coolers 27a and 27b, respectively. The drainage pipe 30 communicates by the intermediary of a valve 54 with a flask 55, equipped with a drainage device. The latter is in communication with the conduit 12 by means of a vent pipe 56.

In the closed vessels prevails the same pressure as in the flasks 26, 26a and 26b, the reservoir 36 and the flask 55 since all these parts of the apparatus are connected to the suction conduit 12. When the cocks 14 and 54 are open, the liquid to be distilled can therefore run by gravity from the reservoir 36 to the flask 55. During this passage, it passes in the sense opposite to the arrow 49 into the closed vessel, where it is caught by the cups 57 of the rotary disks 19. The liquid thus caught runs over the walls of the disks 19 where it is heated by the liquid 44 circulating in these discs. The molecular distillation is effected in this apparatus as in that described in connection with Figs. 1 and 2.

The heating temperature of the disk decreases from the disc 19a toward the disk 19b, and, since the liquid 20 runs in the vessel from the discharge orifice of the pipe 13 to the entrance orifice of the drainage pipe 30, the most volatile products contained in this liquid are first evaporated on the disk 19b, and the less volatile parts of this liquid are in the last instance evaporated on the disk 19a. Thus a fractionated distillation is performed. The most volatile products are collected by the manifold 25 which passes them to the flask 26. The least volatile parts are collected by the manifold 25b which passes them to the flask 26b. The intermediate fractions are collected by the manifold 25a which passes them to the flask 26a. The residue of the distillation runs off into the flask 55. The level of the liquid 20 in the closed vessel is controlled by the height of the overflow 30. The whole run of the distillation is controlled by the suction in the conduit 12, the heating temperature of the liquid 44, the speed of the circulation of this liquid and the speed of running of the liquid to be distilled, 20, in the closed vessel.

The apparatus according to the second embodiment and described hereabove in connection with Figs. 3 and 4, allows the distillation and the fractionation in a very short time. It can therefore be used advantageously for the distillation of heat-sensitive materials, without allowing the temperature necessary for their distillation to exercise a detrimental effect upon them.

The distillation and the fractionation can be carried out at a constant, very low pressure, in general below .01 millimeter of mercury, and at temperatures the variations of which can be regulated by the rates of flow of the matter to be distilled and fractionated and of the liquid carrying the calories.

When the matter to be distilled encloses gases, it is preferably degassed before its introduction into the reservoir 36. The speed of feed of the substance to be distilled and fractionated and the speed of circulation of the fluid carrying the calories regulate the temperature interval at which one wishes to carry out the distillation. Under these conditions, each disc acts in a manner analogous to that of a plate of a rectifier column.

According to a modification, each condenser 21 can yield a fraction and be connected to a receiver flask.

The heating means could be constituted by electrical heating bodies, lodged in the interior of the disks 19. All the disks could be heated to the same temperature when the apparatus does not effect any fractionation but a simple distillation.

In order to illustrate the practical benefits obtainable with my novel apparatus I give below the results obtained with Vetiver Bourbon essence which could not be distilled without partial decomposition under atmospheric or conventionally-used vacuum conditions. The charge consisted of 3900 grams of the anhydrous essence.

| Fraction | Temperature[1] | Pressure, mm. of Hg. | Weight, Grams | Total Weight, Grams | $D^{20}$ | Carbonyl Index | Primary Alcohols[2] | Total Alcohols[3] | $d_{20}$ | $n_D^{20}$ |
|---|---|---|---|---|---|---|---|---|---|---|
| Analysis of Essence subjected to distillation | | | | | +18 | 77.7 | 42.8 | 56.6 | 0.9885 | 1.5252 |
| 1 | 54 | 0.2 | 360 | 360 | −24.6 | 22.8 | 17.3 | 16.6 | 0.9418 | 1.5184 |
| 2 | 58 | 0.05 | 357 | 717 | −27.7 | 29.1 | 22.4 | 19.7 | 0.9480 | 1.5219 |
| 3 | 64 | 0.07 | 500 | 1,217 | −20.7 | 39.1 | 32.6 | 31.2 | 0.9592 | 1.5236 |
| 4 | 65 | 0.06 | 445 | 1,662 | +28 | 51.8 | 42.8 | 51.3 | 0.9796 | 1.5239 |
| 5 | 67 | 0.02 | 446 | 2,108 | +28 | 56.9 | 54.4 | 58.4 | 0.9919 | 1.5248 |
| 6 | 71 | 0.01 | 512 | 2,620 | +43 | 54.2 | 62.4 | 75 | 0.9915 | 1.5254 |
| 7 | 77 | 0.01 | 500 | 3,120 | +53.4 | 54.3 | 69.8 | 83.3 | 1.0003 | 1.5279 |
| 8 | 83 | 0.01 | 254 | 3,374 | +40.2 | 55.2 | 70.2 | 83.9 | 1.0029 | 1.5294 |
| 9 | 95 | 0.01 | 157 | 3,531 | +27.6 | 59 | 60.8 | 83.3 | 1.0089 | 1.5315 |

[1] Temperature of the lower part of the interior of the apparatus at the end of each fraction.
[2,3] Data were obtained by different methods and investigations. Hence, lower figures in fractions 1, 2 and 3 for total alcohols.

The analyses of the various fractions noted in the foregoing table show clearly that the fractions differ considerably in properties from one another.

This application is a continuation of my application, Ser. No. 76,825, filed February 16, 1949, now abandoned.

While I have described my invention in detail in its preferred embodiments, it will be obvious to those skilled in the art, after understanding my invention, that various changes and modifications may be made therein without departing from the spirit or scope thereof. I aim in the appended claims to cover all such modifications and changes.

I claim:

1. Apparatus suitable for molecular fractional distillation which comprises a closed vessel for substance to be distilled, means for maintaining a high vacuum in said vessel, means to heat the substance, a horizontally-disposed rotary shaft in said vessel, other means carried by and coaxial with said shaft to pass into the substance and receive and maintain a body of substance to be distilled in the form of a film during each revolution of said shaft, further means adjacent to said other means to condense the vaporized portion from said film, and condensate-collecting means, the speed of rotation of said shaft and the thickness of film on said other means being so controlled that only a small part of the film is distilled during one revolution the bulk of it being returned during each revolution to the main body of the substance to be distilled.

2. Apparatus as recited in claim 1 wherein said other means comprises a plurality of discs.

3. Apparatus as recited in claim 1 wherein said other means is a rotary disc.

4. Apparatus suitable for molecular fractional distillation, which comprises a closed vessel for substance to be distilled, means for maintaining a high vacuum in said vessel, means to heat the substance, a horizontally-disposed rotary shaft in said vessel, at least one disc carried by and coaxial with said shafts, to pass into the substance and receive and maintain a body of the substance to be distilled in the form of a film during each revolution of said shaft, condensing means adjacent to said at least one disc to condense material vaporized from said at least one disc, and condensate-collecting means, the speed of rotation of said shaft and the thickness of film on said at least one disc being controlled so that only a small part of the film is distilled during one revolution, the bulk of it being returned during each revolution, to the main body of the substance to be distilled.

5. Apparatus as recited in claim 1 wherein at least part of said means for heating the substance is disposed in a manner to heat said other means carried by said shaft.

6. Apparatus suitable for molecular fractional distillation, which comprises a closed vessel to receive a substance to be distilled, means to maintain a layer of the substance in the lower portion of said vessel, means for maintaining a high vacuum in said vessel, a horizontally-disposed rotary shaft in said vessel, a plurality of spaced discs carried by and coaxial with said shaft, the discs being so positioned as to dip into said layer of substance, means to heat said discs including means for maintaining a temperature gradient along said plurality of discs, a series of condenser surfaces in said vessel above said shaft and adjacent to the surfaces of said discs, each disc being located between two adjacent condenser surfaces, and means for collecting the condensate from each condenser surface and for maintaining certain of the condensates separate from one another.

References Cited in the file of this patent

UNITED STATES PATENTS

| | | |
|---|---|---|
| 1,704,796 | Honigmann | Mar. 12, 1929 |
| 1,998,997 | Tolman | Apr. 23, 1935 |
| 2,137,553 | Vigers et al. | Nov. 22, 1938 |
| 2,180,050 | Hickman | Nov. 14, 1939 |
| 2,313,175 | Scott | Mar. 9, 1943 |
| 2,370,462 | Hecker | Feb. 27, 1945 |
| 2,396,374 | Hickman | Mar. 12, 1946 |
| 2,500,900 | Madlen | Mar. 14, 1950 |

FOREIGN PATENTS

| | | |
|---|---|---|
| 351,328 | Great Britain | June 25, 1931 |
| 595,096 | Great Britain | Nov. 26, 1947 |